(12) United States Patent
Kao

(10) Patent No.: US 8,046,993 B2
(45) Date of Patent: Nov. 1, 2011

(54) MICRO GENERATOR SYSTEM

(75) Inventor: Fu-Jen Kao, Taipei (TW)

(73) Assignee: National Yang-Ming University, Taipei (TW)

( * ) Notice: Subject to any disclaimer, the term of this patent is extended or adjusted under 35 U.S.C. 154(b) by 501 days.

(21) Appl. No.: 12/199,228

(22) Filed: Aug. 27, 2008

(65) Prior Publication Data
US 2009/0056328 A1 Mar. 5, 2009

(30) Foreign Application Priority Data

Aug. 27, 2007 (TW) .............................. 96131615 A

(51) Int. Cl.
 *F01B 29/10* (2006.01)
(52) U.S. Cl. ............................ 60/517; 310/11; 310/52

(58) Field of Classification Search .................... 60/517, 60/520, 645; 310/11, 52, 54
See application file for complete search history.

(56) References Cited

U.S. PATENT DOCUMENTS

| | | | | | |
|---|---|---|---|---|---|
| 3,290,567 | A | * | 12/1966 | Gowen .......................... | 136/205 |
| 4,064,409 | A | * | 12/1977 | Redman ........................ | 310/306 |
| 5,329,768 | A | * | 7/1994 | Moscrip .......................... | 60/518 |
| 6,952,060 | B2 | * | 10/2005 | Goldner et al. ............. | 310/12.13 |
| 7,487,641 | B2 | * | 2/2009 | Frechette et al. ............... | 60/653 |
| 2004/0182099 | A1 | * | 9/2004 | Hsu ................................ | 62/259.2 |

* cited by examiner

*Primary Examiner* — Hoang Nguyen
(74) *Attorney, Agent, or Firm* — WPAT, P.C.; Anthony King

(57) ABSTRACT

The present invention relates to a micro generator system which uses temperature difference (about 5~10° C.) between skin and outside environment to allow an engine to drive microfluid flow as well as pass nanomagnetic particles within microfluid through coli to produce an inducing electricity.

4 Claims, 3 Drawing Sheets

MICRO GENERATOR SYSTEM

FIELD OF THE INVENTION

The micro generator system of the present invention can be used in low power devices such as vital sign monitoring device, pacemaker, and animal tracking device.

DESCRIPTION OF PRIOR ART

In recent years, electronic devices and communications products are trending toward portable wireless features, giving rise to the production of high-performance components that are light, thin, short, and small, which in turn increases the need for micro power. Conventional batteries are heavy, short-lived, toxic and require recycling, all of which cannot meet the existing demand for effectively powering microsystem applications. For this reason, it is imperative to develop a new type of automatic and eco-friendly micro power generator.

A power supply system comprises four major components, i.e. energy source, energy access system, energy storage and drive mechanism. An ideal power supply system is one that can obtain energy sources from the surroundings, e.g. thermal generators that make use of the temperature difference of the surrounding to convert heat into electrical energy.

Stirling engine is an external combustion engine that operates based on Stirling thermodynamic cycle. It is a closed-cycle regenerative energy conversion system that is highly efficient in low-temperature environment. It can perform theoretically up to the full Carnot efficiency, both of which are reversible heat engines, having the potential to achieve the highest efficiency of any real heat engine. At present, low-temperature-difference Stirling engine can operate with a very low temperature difference (0.5° C.). This present invention of an automatic micro generator system utilizes the principle of Stirling thermal cycle to generate induced electricity by using the difference of surface skin temperature and the environmental temperature (about 5~10° C.) for the microfluid to produce magnetic flux from repeated thermal expansions and cooling contractions.

SUMMARY OF THE INVENTION

The present invention provides a body heat micro generator comprising, a low-temperature-difference body heat engine and a coil wherein a thermal insulation zone is installed between the high-temperature zone and the low-temperature zone of the engine; and a closed-end microduct that surrounds these three zones.

DETAILED DESCRIPTION OF THE INVENTION

This present invention is directed to an automatic micro generator system which uses temperature difference (about 5~10° C.) between the skin and the environment to allow an engine to drive microfluid flow and pass nano-magnetic particles within the microfluid through a coil to produce an induced electricity from magnetic flux. The electricity generated by this micro generator using temperature difference can be sustainably used in micro-devices such as hearing aids, pacemakers, and micro-transmitters. The micro generator is eco-friendly with a long product life cycle, which overcomes the inconvenience of frequent replacement when using conventional batteries, while offering a solution for recycling and environmental protection.

The micro generator of the present invention comprises a low-temperature-difference body heat engine and a coil wherein a thermal insulation zone is installed between the high-temperature zone and the low-temperature zone of the engine to prevent direct heat convection between the high-temperature zone and the low-temperature zone. A closed-end microduct surrounds these three zones, in which the duct is filled with working fluid and nano-magnetic particles while the coil encircles a portion of the microduct. The micro generator system uses the temperature difference between the skin and the environment to allow an engine to drive microfluid flow and pass nano-magnetic particles within the microfluid through a coil to produce an induced electricity from magnetic flux for use in small components.

The micro generator can further comprise a thermal transfer plate and a magnetic field array to enhance the effectiveness of the engine operation and increase the magnetic flux.

Existing micro thermoelectric generators are mostly piezoelectric micro generator systems, using one of the electrothermal features of semiconductors, Seebeck effect, to convert thermal energy into electrical energy. This type of thermoelectric generator is formed by multiple series connections or zig-zag arrangement of thermocouples in linking two different conductors or semiconductors, where the voltage produced by temperature difference between the two sides of the thermocouples generates electrical current as a result of Seebeck effect.

Compared to the above-mentioned micro generator system, the micro generator system of the present invention automatically generates electricity based on the principle of the Stirling thermodynamic cycle, using the temperature difference (about 5~10° C.) between the skin and the environment to allow an engine to drive structured magnetic microfluid flow (e.g. adding air bubbles in the microfluid duct) and pass nano-magnetic particles within the microfluid through a coil to produce an induced electricity from magnetic flux for use in low power devices, such as tracking devices and pacemakers.

Example FIG. 1 was a vertical schematic structural diagram and FIG. 2 was a 3-dimensional schematic structural diagram of the micro generator system of the present invention. The micro generator system comprised a low-temperature-difference body heat engine and a coil 6 wherein a thermal insulation zone 3 was installed between the high-temperature zone 2 and the low-temperature zone 1 of the engine to prevent direct heat convection between zone 1 and 2. A closed-end microduct 5 surrounded these three zones, in which the microduct 5 was filled with working fluid and nano-magnetic particles 52. The working fluid could be water, ammonia or FREON, which by adjusting the pressure inside the microduct made it a low boiling point working fluid. The coil 6 encircled the microduct 5 in the thermal insulation zone 3. In addition, a thermal transfer plate 4 was installed on the exterior of the high-temperature zone 2 to allow skin surface temperature to be quickly transferred to the said high-temperature zone 2. When the skin surface heat was transferred via the thermal transfer plate 4 to the working fluid in the high-temperature zone 2, the fluid underwent thermal expansion and drove the flow of the structured magnetic microfluid, bringing the nano-magnetic particles 52 toward the low-temperature zone 1. When the nano-magnetic particles 52 in the microfluid passes through the coil 6 on the microduct 5 in the thermal insulation zone 3, the nano-magnetic particles 52 generate magnetic flux inside the coil 6, thus the coil 6 produces electrical current. In the present invention, structured magnetic microfluid could be produced by increasing the diameter of the magnetic nano-particles or by filling air bubbles 53 at a fixed space interval inside the microduct 5.

FIG. 3 was a schematic structural diagram of a preferred embodiment of the micro generator system of the present invention. This generator system comprised a low-temperature-difference body heat engine, a coil 6, a rectifier and a transformer. In front of the sensor area of the coil 6, a magnetic field array 7 was set up on the exterior of the microduct 5 to fix the magnetic direction of magnetic particles 52 for synchronized rotation of the said magnetic particles 52, allowing increased magnetic flux when the particles 52 entered the sensor area of the coil 6 to maximize the induced current. The magnetic field array 7 was a permanent magnetic field which fixed the direction of the nano-magnetic particles 52, preventing the offset of the magnetic field among the nano-magnetic particles 52. Two one-way microvalves 51 were installed on the microduct 5 in the high-temperature and low-temperature zone to control the direction of the working fluid.

DESCRIPTION OF COMPONENTS IN FIGURES

Figure 1:
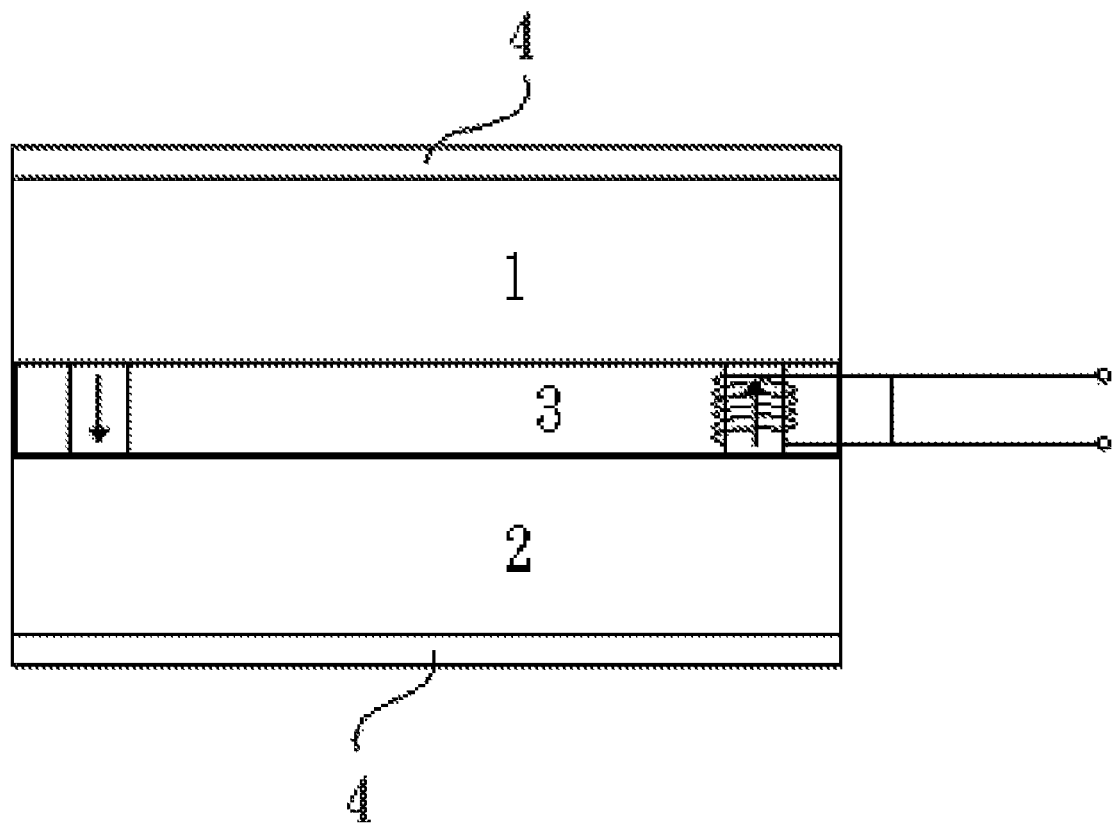
FIG. 1 is a vertical schematic structural diagram of this invention of a micro generator system.
Figure 2:
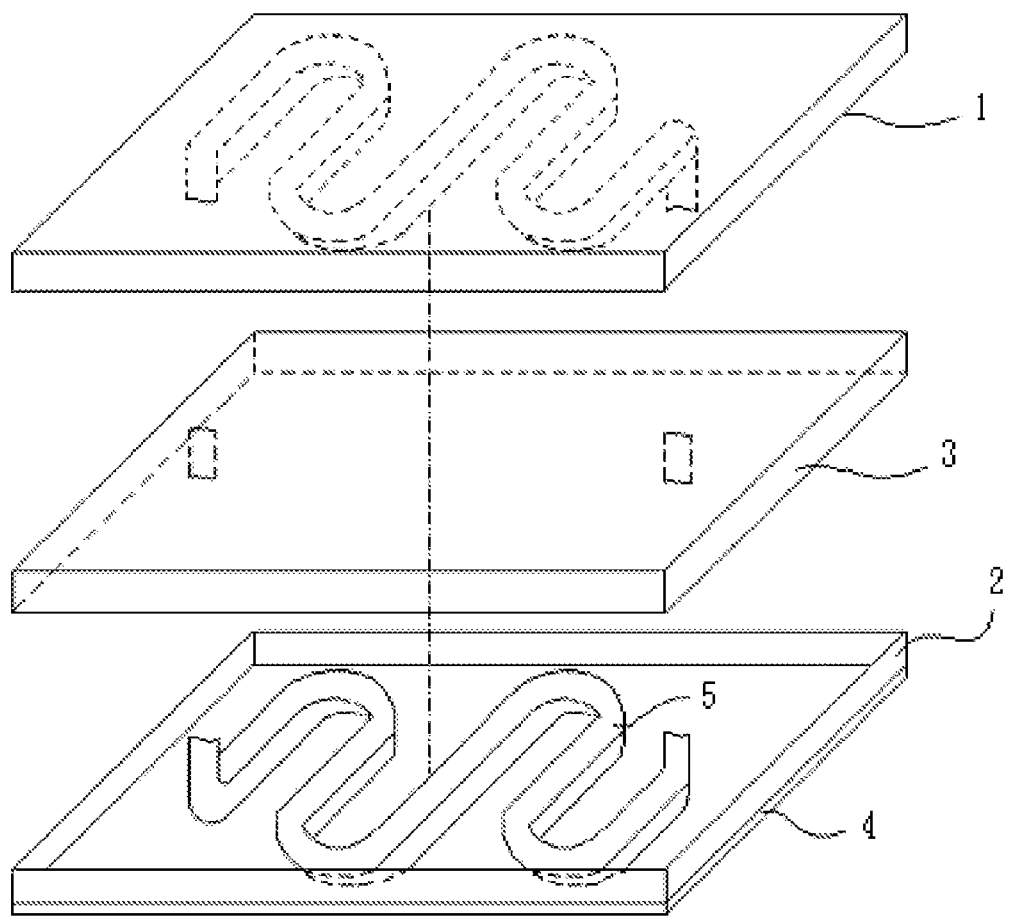
FIG. 2 is a 3-dimensional schematic structural diagram of this present invention of a micro generator system.
Figure 3:
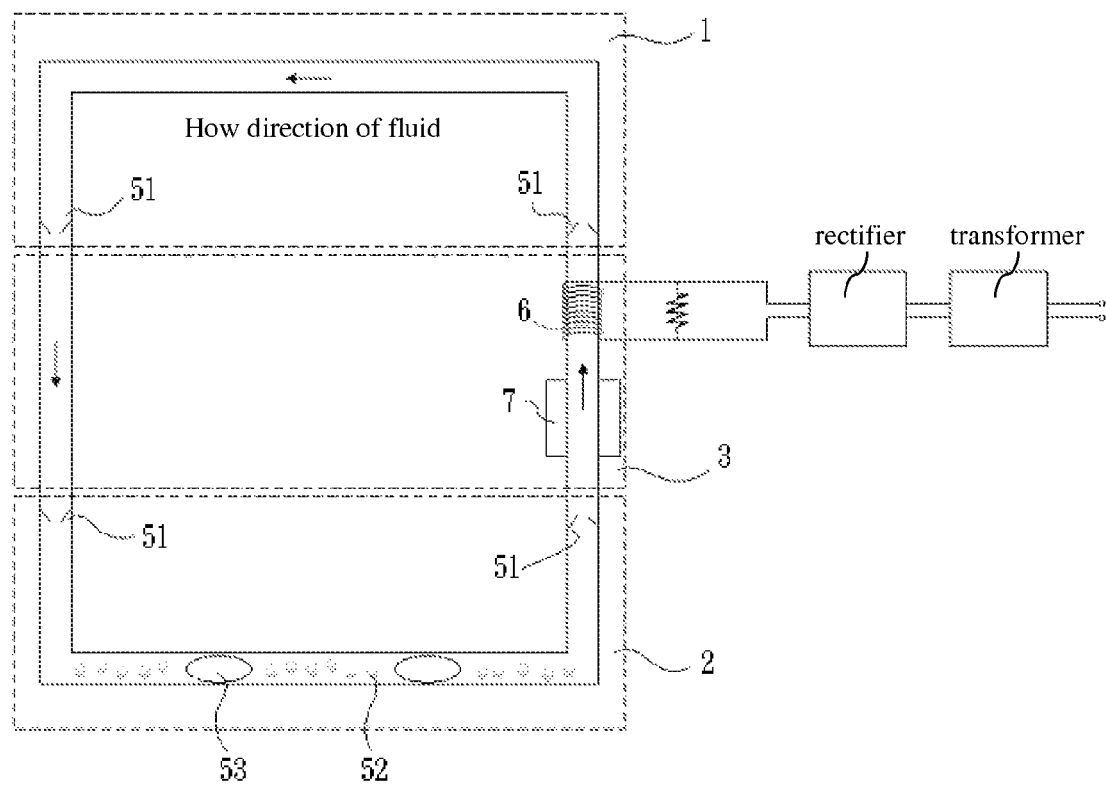
FIG. 3 is a schematic structural diagram of a preferred embodiment of the present invention of a micro generator system.

1 low-temperature zone
2 high-temperature zone
3 thermal insulation zone
4 thermal transfer plate
5 closed-end microduct
51 microvalve
52 magnetic particles
53 air bubble
6 coil
7 magnetic field array

What is claimed is:

1. A body heat micro generator comprising, a low-temperature-difference body heat engine and a coil wherein a thermal insulation zone is installed between the high-temperature zone and the low-temperature zone of the engine; and a closed-end microduct that surrounds these three zones, wherein the microduct is filled with working fluid and nano-magnetic particles,
    wherein the low-temperature-difference body heat engine further comprising a thermal transfer plate each on the exterior of the high-temperature and low-temperature zone to enhance engine performance,
    wherein said coil encircles the microduct in the thermal insulation zone,
    wherein said microduct forms a continuous S-shape in the high-temperature and low-temperature zone and directly passes the thermal insulation zone to form a closed-end microduct.

2. The micro generator of claim 1 wherein said high-temperature and low-temperature zone are each installed with one-way microvalves.

3. The micro generator of claim 1 wherein said working fluid can be water, ammonia or FREON.

4. The micro generator of claim 1 wherein the micro generator further comprising a magnetic field array in the thermal insulation zone to increase the magnetic flux of the engine.

* * * * *